United States Patent
Chen et al.

(10) Patent No.: US 12,356,133 B2
(45) Date of Patent: Jul. 8, 2025

(54) EARPHONE POSITION ADJUSTMENT METHOD AND APPARATUS, AND EQUIPMENT AND STORAGE MEDIUM

(71) Applicant: GOERTEK INC., Shandong (CN)

(72) Inventors: Lei Chen, Shandong (CN); Shaoqian Zhang, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 248 days.

(21) Appl. No.: 18/041,047

(22) PCT Filed: Dec. 16, 2020

(86) PCT No.: PCT/CN2020/136953
§ 371 (c)(1),
(2) Date: Feb. 8, 2023

(87) PCT Pub. No.: WO2022/041585
PCT Pub. Date: Mar. 3, 2022

(65) Prior Publication Data
US 2023/0269515 A1    Aug. 24, 2023

(30) Foreign Application Priority Data
Aug. 25, 2020  (CN) .......................... 202010860323.3

(51) Int. Cl.
*H04R 1/10* (2006.01)
*G01S 13/06* (2006.01)

(52) U.S. Cl.
CPC ............ *H04R 1/1041* (2013.01); *G01S 13/06* (2013.01)

(58) Field of Classification Search
CPC .............................. G01S 13/06; H04R 1/1041
See application file for complete search history.

(56) References Cited

U.S. PATENT DOCUMENTS

| 9,668,042 B1 | 5/2017 | Kim et al. |
| 10,187,720 B1 | 1/2019 | Kim et al. |
| 2005/0165460 A1 | 7/2005 | Erfan |

(Continued)

FOREIGN PATENT DOCUMENTS

| CN | 104936054 A | 9/2015 |
| CN | 207216146 U | 4/2018 |

(Continued)

*Primary Examiner* — Simon King
(74) *Attorney, Agent, or Firm* — LKGlobal | Lorenz & Kopf, LLP (57) ABSTRACT

A method and device for adjusting a position of an earphone, equipment and storage medium are disclosed. The earphone is provided with a TOF sensor. The method comprises: acquiring position information of an ear using the TOF sensor, wherein the position information of the ear includes positions of points describing the ear in morphology; determining a position of a center point of an ear canal of the ear according to the position information of the ear; acquiring a position of a center point of the earphone; and outputting an adjustment vector of the position of the earphone according to the position of the center point of the ear canal and the position of the center point of the earphone.

15 Claims, 2 Drawing Sheets

(56) References Cited

U.S. PATENT DOCUMENTS

| | | | | |
|---|---|---|---|---|
| 2007/0057941 A1* | 3/2007 | Fang | .................... | H04R 25/658 |
| | | | | 700/118 |
| 2007/0201713 A1* | 8/2007 | Fang | .................... | H04R 25/658 |
| | | | | 381/322 |
| 2017/0332186 A1* | 11/2017 | Riggs | ....................... | H04S 3/008 |
| 2019/0230453 A1* | 7/2019 | Wagner | .................. | H04R 25/00 |
| 2020/0275216 A1* | 8/2020 | McKinney | ............. | A61B 5/126 |
| 2023/0027011 A1* | 1/2023 | Arakawa | ................. | G06V 40/10 |

FOREIGN PATENT DOCUMENTS

| | | | |
|---|---|---|---|
| CN | 108391205 | A | 8/2018 |
| CN | 109164410 | A | 1/2019 |
| CN | 208402070 | U | 1/2019 |
| CN | 110291797 | A | 9/2019 |
| CN | 111289989 | A | 6/2020 |
| CN | 111741400 | A | 10/2020 |

\* cited by examiner

FIG. 4 ation No. PCT/CN2020/136953, filed Dec. 16, 2020 which was published under PCT Article 21(2) and which claims priority to Chinese Application No. 202010860323.3, filed Aug. 25, 2020, which are all hereby incorporated herein in their entirety by reference.

EARPHONE POSITION ADJUSTMENT METHOD AND APPARATUS, AND EQUIPMENT AND STORAGE MEDIUM

CROSS-REFERENCE TO RELATED APPLICATIONS

This application is a U.S. National-Stage entry under 35 U.S.C. § 371 based on International Application No. PCT/CN2020/136953, filed Dec. 16, 2020 which was published under PCT Article 21(2) and which claims priority to Chinese Application No. 202010860323.3, filed Aug. 25, 2020, which are all hereby incorporated herein in their entirety by reference.

TECHNICAL FIELD

This application pertains to the field of acoustic technology, more specifically, to a method for adjusting a position of an earphone, a device for adjusting a position of an earphone, a headset and a computer-readable storage medium.

BACKGROUND

At present, VR (Virtual Reality)/AR (Augmented Reality) devices have been widely used. In order to improve the virtual and real combined immersion feeling of users, VR/AR devices are usually equipped with earphones to achieve audio-visual integration. However, when a user uses a VR/AR device, the wearing position of the VR/AR device is often inaccurate. In this situation, even if the user manually adjusts the wearing position of the VR/AR device, it is difficult to adjust to the exact position, and thus the user cannot experience the best acoustic system design of the VR/AR device, in other words, the best listening experience cannot be achieved. In addition, other objects, desirable features and characteristics will become apparent from the subsequent summary and detailed description, and the appended claims, taken in conjunction with the accompanying drawings and this background.

SUMMARY

An object of the present disclosure is to provide a new technical solution for adjusting a position of an earphone.

According to a first aspect of the present disclosure, a method for adjusting a position of an earphone is provided. The earphone is provided with a TOF (Time-of-Flight) sensor. The method comprises:
  acquiring position information of an ear using the TOF sensor, wherein the position information of the ear includes positions of points describing the ear in morphology;
  determining a position of a center point of an ear canal of the ear according to the position information of the ear;
  acquiring a position of a center point of the earphone; and
  outputting an adjustment vector of the position of the earphone according to the position of the center point of the ear canal and the position of the center point of the earphone.

Optionally, acquiring the position of the center point of the earphone comprises:
  determining the position of the center point of the earphone according to a position of the TOF sensor relative to the center point of the earphone.

Optionally, determining the position of the center point of the ear canal according to the position information of the ear comprises:
  determining the position of the center point of the ear canal from the position information of the ear by using a big top heap sorting method.

Optionally, the method further comprises:
  determining a contour of the ear canal according to the position information of the ear;
  acquiring a current position of the center point of the earphone after the position of the earphone is adjusted;
  when the center point of the earphone is within the contour of the ear canal, stopping the adjustment of the position of the earphone;
  when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

Optionally, determining the contour of the ear canal according to the position information of the ear comprises:
  determining contour information of the ear according to the position information of the ear;
  performing edge detection on the contour information of the ear to obtain a plurality of closed edge curves; and
  determining a shortest closed edge curve in the closed edge curves as the contour of the ear canal.

Optionally, performing edge detection on the contour information of the ear to obtain a plurality of closed edge curves comprises:
  using a Roberts edge detection operator to perform edge detection on the contour information of the ear to obtain a plurality of closed edge curves.

According to a second aspect of the present disclosure, a device for adjusting a position of an earphone is provided. The earphone is provided with a TOF sensor. The device comprises:
  a first acquisition module for acquiring position information of an ear using the TOF sensor, wherein the position information of the ear includes positions of points describing the ear in morphology;
  a first determination module for determining a position of a center point of an ear canal of the ear according to the position information of the ear;
  a second acquisition module for acquiring a position of a center point of the earphone; and
  a first output module for outputting an adjustment vector of the position of the earphone according to the position of the center point of the ear canal and the position of the center point of the earphone.

Optionally, the device further comprises:
  a second determination module for determining a contour of the ear canal according to the position information of the ear;
  a third acquisition module for acquiring a current position of the center point of the earphone after the position of the earphone is adjusted;
  a stopping module for, when the center point of the earphone is within the contour of the ear canal, stopping the adjustment of the position of the earphone; and
  a second output module for, when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

According to a third aspect of the present disclosure, a headset is provided. The headset is provided with an earphone, and the earphone is provided with a TOF sensor. The headset comprises the device as described in the second aspect;

or, the headset comprises a memory and a processor, the memory is used to store computer instructions, and the processor is used to call the computer instructions from the memory to execute the method as described in any item of the first aspect.

According to a fourth aspect of the present disclosure, a computer-readable storage medium is provided, on which a computer program is stored. When the computer program is executed by a processor, the method as described in any item of the first aspect is implemented.

In embodiments of the present disclosure, the earphone is provided with a TOF sensor, the TOF sensor is used to acquire position information of an ear; a position of a center point of an ear canal of the ear is determined according to the position information of the ear; a position of a center point of the earphone is acquired; an adjustment vector of the position of the earphone is output according to the position of the center point of the ear canal and the position of the center point of the earphone. In this way, after obtaining the adjustment vector of the position of the earphone, the user manually adjusts the position of the earphone according to the adjustment vector, so that the center of the earphone is close to the center of the ear canal, or even coincides with the center of the ear canal. In this situation, the wearing position of the headset is accurate, and the user can have the best listening experience. That is to say, the embodiments of the present disclosure provide a basis for the user to have the best listening experience.

Other features and advantages of the present disclosure will become clear by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless specified otherwise, the arrangements of the members and steps, mathematical formulas and numerical values described in these embodiments do not restrict the scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail. However, when applicable, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

<Hardware Configuration Embodiment>

Figure 1:
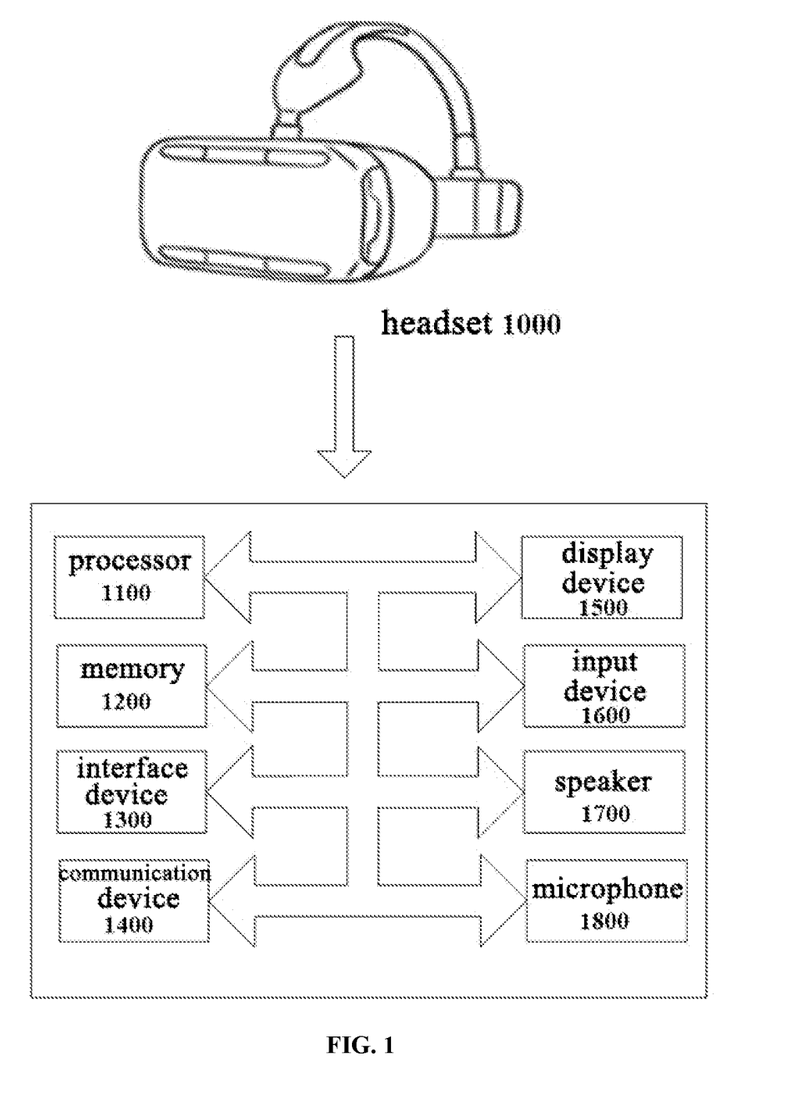
FIG. 1 is a block diagram of the hardware configuration of a headset that realizes a method of adjusting a position of an earphone according to an embodiment of the present disclosure.

FIG. 1 is a block diagram of the hardware configuration of a headset that realizes a method of adjusting a position of an earphone according to an embodiment of the present disclosure.

The headset 1000 may be a virtual reality (VR) headset, a mixed reality (MR) headset, an augmented reality (AR) headset, or headphones.

The headset 1000 may comprise a processor 1100, a memory 1200, an interface device 1300, a communication device 1400, a display device 1500, an input device 1600, a speaker 1700, a microphone 1800, etc. The processor 1100 may be a central processing unit (CPU), a micro processing unit (MCU), etc. The memory 1200 comprises, for example, ROM (read only memory), RAM (random access memory), non-volatile memory such as a hard disk, etc. The interface device 1300 comprises, for example, a USB interface, an earphone jack, etc. The communication device 1400 can perform wired or wireless communication, for example. The display device 2500 is, for example, a liquid crystal display screen, a touch screen, etc. The input device 1600 may comprise, for example, a touch screen, a keyboard, etc. The user can input/output voice information through the speaker 1700 and the microphone 1800.

Although a plurality of devices are shown for the headset 1000 in FIG. 1, the present disclosure may relate only to some of them, for example, the headset 1000 relates only to the memory 1200 and the processor 1100.

In the embodiment of the present disclosure, the memory 1200 of the headset 1000 is used to store instructions, and the instructions are used to control the processor 1100 to execute the method for adjusting a position of an earphone according to the embodiments of the present disclosure.

In the above description, technicians can design instructions according to the solution disclosed in the present disclosure. It is well known in the art how an instruction controls the processor to operate, so it will not be described in detail here.

<Method Embodiments>

An embodiment of the present disclosure provides a method for adjusting a position of an earphone, which is implemented by a headset as shown in FIG. 1, and an earphone on at least one side of the headset is provided with a TOF sensor.

It should be noted that when the TOF sensor is provided on an earphone on one side of the headset, the positions of two earphones of the headset may be adjusted according to the TOF sensor provided on the earphone on one side of the headset, because the wearing position is usually symmetrical when users wear the headset. Correspondingly, if earphones on both sides of the headphone are provided with TOF sensors, the position of each earphone of the headphone may be adjusted according to the TOF sensor provided on the corresponding earphone.

Figure 2:
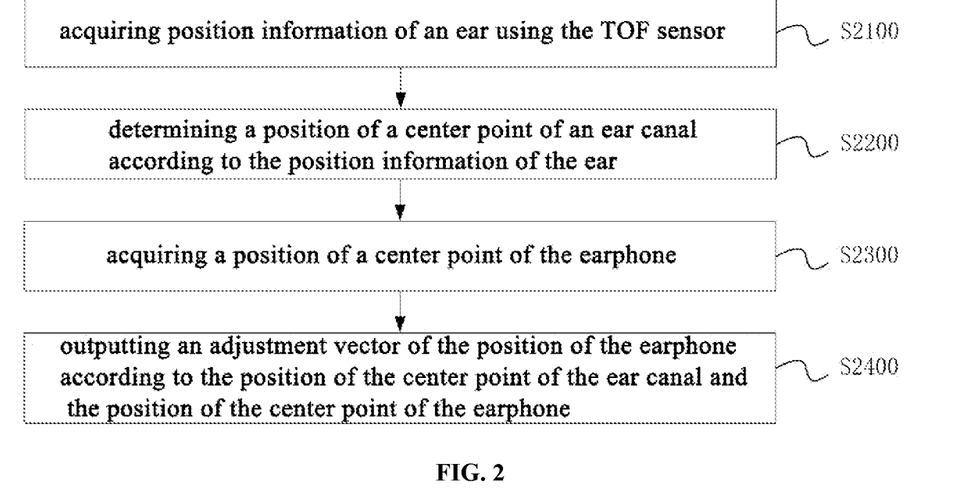
FIG. 2 is a schematic flow diagram of a method for adjusting a position of an earphone according to an embodiment of the present disclosure.

As shown in FIG. 2, the method comprises the following steps S2100-S2400:

S2100. acquiring position information of an ear using the TOF sensor.

The position information of the ear includes positions of the points describing the ear in morphology.

In the embodiment of the present disclosure, the earphone is provided with a TOF sensor. When the user wears the headset, the earphone on the headset will cover the ear. At this point, the TOF sensor obtains the position information of the ear, which includes the position of points describing the ear in morphology. On this basis, the headset can acquire the position information of the ear using the TOF sensor.

For each point describing the ear in morphology, the position of the point is a three-dimensional coordinate position, and the origin of the three-dimensional coordinate system corresponding to the three-dimensional coordinate value may be any one of the points describing the ear in morphology. In addition, in the three-dimensional coordinate position, the coordinate values of the x-axis and y-axis are used to represent the position of the point on the plane where the ear is located, and the coordinate value of the z-axis is used to represent the distance between the TOF sensor and the point.

S2200. determining a position of a center point of an ear canal of the ear according to the position information of the ear.

In the embodiment of the present disclosure, the position of the center point of the ear canal is used to indicate the position of the (outer) ear canal. Understandably, comparing with other parts of the ear, a point corresponding to the ear canal in the position information of the ear is the point having the largest depth value. Therefore, the point having the largest depth value in the position information of the ear is taken as the position of the center point of the ear canal.

In an embodiment of the present disclosure, the above S2200 may specifically be realized by traversing the position information of the ear to find the point having the largest depth value in the position information of the ear, i.e., the point having the largest coordinate value of the z-axis, and take the point found as the position of the center point of the ear canal.

In another embodiment of the present disclosure, the above S2200 may also be specifically realized by the following S2210:

S2210. determining the position of the center point of the ear canal from the position information of the ear by using a big top heap sorting method.

In the embodiment of the present disclosure, the position of the center point of the ear canal can be quickly and accurately determined from the position information by using the big top heap sorting method.

S2300. acquiring a position of a center point of the earphone.

In the embodiment of the present disclosure, the center point of the earphone is the center point of the side face of the earphone that contacts the ear. The position of the center point of the earphone is the position of the center point of the earphone on the plane formed by the x-axis and y-axis in the three-dimensional coordinate system corresponding to the position information of the ear.

In an embodiment of the present disclosure, the above S2300 may specifically be realized by the following S2310:

S2310. determining the position of the center point of the earphone according to a position of the TOF sensor relative to the center point of the earphone.

In the embodiment of the present disclosure, the position of the TOF sensor relative to the center point of the earphone are measured by the headset before leaving the factory and stored in the headset in advance. On this basis, the position of the center point of the earphone may be obtained by using the corresponding coordinate origin in the position information of the ear.

S2400. outputting an adjustment vector of the position of the earphone according to the position of the center point of the ear canal and the position of the center point of the earphone.

In the embodiment of the present disclosure, according to the position of the center point of the ear canal, the position of the center point of the ear canal projected on the plane of the x axis and y axis is obtained. According to the position of the center point of the ear canal projected on the plane of the x-axis and y-axis and the position of the center point of the earphone, a position vector of the center point of the earphone relative to the center point of the ear canal is determined, and the position vector is determined as the adjustment vector of the earphone.

In an example, the adjustment vector may be 0.5 cm below.

In an example, if the headset is a VR/AR/MR headset, the adjustment vector may be displayed on the display screen of the headset.

In another example, when the headset is headphones, the adjustment vector of the position of the earphone may be output by voice.

In the embodiments of the present disclosure, after obtaining the adjustment vector of the position of the earphone, the user manually adjusts the position of the earphone according to the adjustment vector, so that the center of the earphone is close to the center of the ear canal, or even coincides with the center of the ear canal. In this situation, the wearing position of the headset is accurate, and the user can have the best listening experience.

In the embodiments of the present disclosure, the earphone is provided with a TOF sensor, the TOF sensor is used to acquire the position information of an ear, the position of the center point of the ear canal is determined according to the position information of the ear, the position of the center point of the earphone is acquired; the adjustment vector of the position of the earphone is output according to the position of the center point of the ear canal and the center point of the earphone. In this way, after obtaining the adjustment vector of the position of the earphone, the user manually adjusts the position of the earphone according to the adjustment vector, so that the center of the earphone is close to the center of the ear canal, or even coincides with the center of the ear canal. In this situation, the wearing position of the headset is accurate, and the user can have the best listening experience. That is to say, the embodiments of the present disclosure provide a basis for the user to have the best listening experience.

On the basis of any of the above embodiments, the method for adjusting a position of an earphone according to the embodiment of the present disclosure further comprises the following S2500-S2800:

S2500. determining a contour of the ear canal according to the position information of the ear.

In the embodiment of the present disclosure, the contour of the ear canal is represented by the contour information of the ear. The contour information of the ear canal includes the positions of points corresponding to the contour of the ear canal in the position information of the ear.

In an embodiment, the S2500 may specifically be realized by using a first neural network model to obtain the contour of the ear canal according to the position information of the ear. The first neural network model is a model trained in advance that can extract the contour of the ear canal from the position information of the ear.

In another embodiment, the above S2500 may also be realized by S2510-S2530 as follows:

S2510. determining the contour information of the ear according to the position information of the ear;

In the present disclosure, according to the position information of the ear, the points whose depth values are continuous in the direction of the ear contour may be determined according to the depth values corresponding to the points, and the corresponding points are taken as the ear contour information.

In an embodiment, the above S2510 may specifically be realized by using a second neural network model to obtain the contour information of the ear according to the position information of the ear. The second neural network model is a model trained in advance that can extract the contour information of the ear from the position information of the ear.

S2520. performing edge detection on the contour information of the ear to obtain a plurality of closed edge curves;

In an embodiment, the above S2520 may specifically be realized by using a Roberts edge detection operator to perform edge detection on the contour information of the ear to obtain the plurality of closed edge curves.

In the embodiment of the present disclosure, the plurality of closed edge curves are represented by points forming the corresponding edge curves.

In another embodiment, the above S2520 may also be realized by other edge detection operators, such as a canny edge detection operator.

S2530. determining a shortest closed edge curve in the closed edge curves as the contour of the ear canal.

Understandably, the shortest closed edge curve in the ear is the contour of the ear canal. On this basis, the contour of ear canal may be obtained by executing the S2510-S2530 above.

S2600. acquiring a current position of the center point of the earphone after the position of the earphone is adjusted;

In the embodiment of the present disclosure, when the position information of the earphone obtained at the current moment is different from the position information at the previous moment, it indicates that the position of the earphone has been adjusted.

The position of the current center point of the earphone indicates the position of the center point of the earphone after the position of the earphone is adjusted. After the position of the earphone is adjusted, the current position of the center point of the earphone is obtained using a method such as the above S2300.

S2700. when the center point of the earphone is within the contour of the ear canal, stopping the adjustment of the position of the earphone;

S2800. when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

In the embodiment of the present disclosure, when the position of the center point of the earphone is located within the contour of the ear canal, it indicates that the center point of the earphone is close to or even coincides with the center point of the ear canal, and thus the earphone has been accurately worn, so no position adjustment is needed. On this basis, the headset can output an instruction of stopping the adjustment.

In the embodiment of the present disclosure, the current position of the center point of the ear canal represents the position of the center point of the ear canal after the position of the earphone is adjusted. When the center point of the earphone is not within the contour of the ear canal, it indicates that the user is manually adjusting the earphone, but the earphone is still not worn accurately. On this basis, the headset determines the current position of the center point of the ear canal and the current position of the center point of the earphone, so as to re-determine and output an adjustment vector of the position of the earphone to perform a next position adjustment.

<Device Embodiments>

Figure 3:
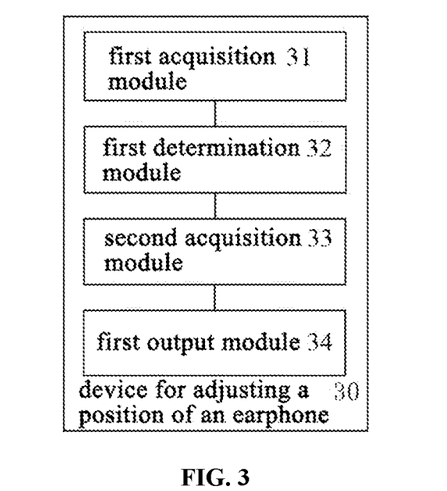
FIG. 3 is a schematic diagram of the structure of a device for adjusting a position of an earphone according to an embodiment of the present disclosure.

An embodiment of the present disclosure provides a device 30 for adjusting a position of an earphone. The earphone is provided with a TOF sensor.

As shown in FIG. 3, the device 30 for adjusting a position of an earphone comprises a first acquisition module 31, a first determination module 32, a second acquisition module 33, and a first output module 34. Specifically, the first acquisition module 31 is for acquiring position information of an ear using the TOF sensor, wherein the position information of the ear includes positions of points describing the ear in morphology;

the first determination module 32 is for determining a position of a center point of an ear canal of the ear according to the position information of the ear;

the second acquisition module 33 for acquiring a position of a center point of the earphone; and the first output module 34 is for outputting an adjustment vector of the position of the earphone according to the position of the center point of the ear canal and the position of the center point of the earphone.

In an embodiment, the second acquisition module 33 is specifically for determining the position of the center point of the earphone according to a position of the TOF sensor relative to the center point of the earphone.

In an embodiment, the first acquisition module 31 is specifically for determining the position of the center point of the ear canal from the position information of the ear by using a big top heap sorting method.

In an embodiment, the device 30 for adjusting a position of an earphone further comprises:

a second determination module for determining a contour of the ear canal according to the position information of the ear;

a third acquisition module for acquiring a current position of the center point of the earphone after the position of the earphone is adjusted;

a stopping module for, when the center point of the earphone is within the contour of the ear canal, stopping the adjustment of the position of the earphone; and a second output module for, when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

In an embodiment, the second determination module is further comprises:

a first determining unit for determining the contour information of the ear according to the position information of the ear;

a detection unit for performing edge detection on the contour information of the ear to obtain a plurality of closed edge curves; and a second determination unit for determining a shortest closed edge curve in the closed edge curves as the contour of the ear canal.

In an embodiment, the detection unit is specifically for using a Roberts edge detection operator to perform edge detection on the contour information of the ear to obtain the plurality of closed edge curves.

<Equipment Embodiment>

Figure 4:
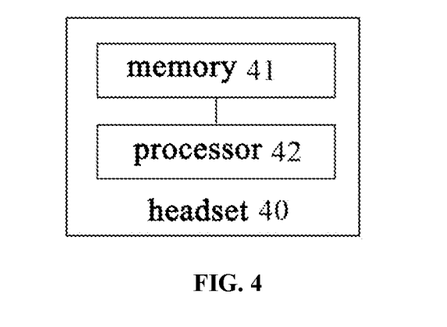
FIG. 4 is a schematic diagram of the structure of an earphone according to an embodiment of the present disclosure.

The embodiment of the present disclosure provides a headset 40, the headset 40 is provided with an earphone, the earphone is provided with a TOF sensor, and the headset 40 comprises the device 30 for adjusting a position of an earphone provided in the above device embodiment;

or, the headset 40 comprises a memory 41 and a processor 42, the memory 41 is used to store computer instructions, and the processor 42 is used to call the computer instructions from the memory 41 to execute the method for adjusting a position of an earphone described in any of the above method embodiments.

<Storage Medium Embodiment>

The embodiment of the present disclosure provides a computer-readable storage medium having a computer program stored thereon. When the computer program is executed by a processor, the method for adjusting a position of an earphone described in any of the above method embodiments is realized.

The present disclosure may be a method, a system and/or a computer program product. The computer program product may include a computer-readable storage medium loaded with computer-readable program instructions thereon for a processer to execute various aspects of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any appropriate combination thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combination thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives the computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combination of one or more programming languages. The programming languages include object-oriented programming languages, such as Smalltalk, C++, and conventional procedural programming languages, such as "C" language or similar programming languages. The computer-readable program instructions may be completely or partially executed on a user computer, or executed as an independent software package, or executed partially on a user computer and partially on a remote computer, or completely executed on a remote computer or a server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combination of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the embodiments, or to enable other skilled persons in the art to understand the embodiments disclosed herein. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for adjusting a position of an earphone, wherein the earphone is provided with a TOF (Time-of-Flight) sensor, and the method comprises:
    acquiring position information of an ear using the TOF sensor, wherein the position information of the ear includes positions of points describing the ear in morphology;
    determining a position of a center point of an ear canal according to the position information of the ear;
    acquiring a position of a center point of the earphone; and
    outputting an adjustment vector of the position of the earphone according to the position of the center point of the ear canal and the position of the center point of the earphone.

2. The method according to claim 1, wherein acquiring the position of the center point of the earphone comprises:
    determining the position of the center point of the earphone according to a position of the TOF sensor relative to the center point of the earphone.

3. The method according to claim 1, wherein determining the position of the center point of the ear canal according to the position information of the ear comprises:
    determining the position of the center point of the ear canal from the position information of the ear by using a big top heap sorting method.

4. The method according to claim 1, further comprising:
    determining a contour of the ear canal according to the position information of the ear;
    acquiring a current position of the center point of the earphone after the position of the earphone is adjusted;
    when the center point of the earphone is within the contour of the ear canal, stopping the adjustment of the position of the earphone; and
    when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

5. The method according to claim 4, wherein determining the contour of the ear canal according to the position information of the ear comprises:
    determining contour information of the ear according to the position information of the ear;
    performing edge detection on the contour information of the ear to obtain a plurality of closed edge curves; and
    determining a shortest closed edge curve in the closed edge curves as the contour of the ear canal.

6. The method according to claim 5, wherein performing edge detection on the contour information of the ear to obtain a plurality of closed edge curves comprises:
    using a Roberts edge detection operator to perform edge detection on the contour information of the ear to obtain a plurality of closed edge curves.

7. A device for adjusting a position of an earphone, wherein the earphone is provided with a TOF (Time-of-Flight) sensor, and the device comprises:
    a first acquisition module for acquiring position information of an ear using the TOF sensor, wherein the position information of the ear includes positions of points describing the ear in morphology;
    a first determination module for determining a position of a center point of an ear canal according to the position information of the ear;
    a second acquisition module for acquiring a position of a center point of the earphone; and a first output module for outputting an adjustment vector of the position of the earphone according to the position of the center point of the ear canal and the position of the center point of the earphone.

8. The device according to claim 7, further comprising:
a second determination module for determining a contour of the ear canal according to the position information of the ear;
a third acquisition module for acquiring a current position of the center point of the earphone after the position of the earphone is adjusted;
a stopping module for, when the center point of the earphone is within the contour of the ear canal, stopping the adjustment of the position of the earphone; and
a second output module for, when the position of the center point of the earphone is not within the contour of the ear canal, acquiring a current position of the center point of the ear canal, and outputting an adjustment vector of the position of the earphone according to the current position of the center point of the ear canal and the current position of the center point of the earphone.

9. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 1.

10. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 2.

11. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 3.

12. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 4.

13. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 5.

14. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 6.

15. A headset, wherein the headset is provided with an earphone, and the earphone is provided with a TOF sensor, and the headset comprises the device according to claim 8; or,
the headset comprises a memory and a processor, the memory is used to store computer instructions, and the processor is used to call the computer instructions from the memory to execute the method according to claim 7.

* * * * *